United States Patent
McGuire, II

(10) Patent No.: US 10,145,264 B2
(45) Date of Patent: Dec. 4, 2018

(54) VARIABLE VANE ACTUATION SYSTEM

(71) Applicant: United Technologies Corporation, Hartford, CT (US)

(72) Inventor: James F. McGuire, II, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 359 days.

(21) Appl. No.: 14/902,351

(22) PCT Filed: Jul. 2, 2014

(86) PCT No.: PCT/US2014/045176
§ 371 (c)(1),
(2) Date: Dec. 31, 2015

(87) PCT Pub. No.: WO2015/050607
PCT Pub. Date: Apr. 9, 2015

(65) Prior Publication Data
US 2016/0376914 A1   Dec. 29, 2016

Related U.S. Application Data

(60) Provisional application No. 61/843,614, filed on Jul. 8, 2013.

(51) Int. Cl.
*F01D 17/16* (2006.01)
*F04D 29/56* (2006.01)
*F04D 27/02* (2006.01)

(52) U.S. Cl.
CPC ........ *F01D 17/162* (2013.01); *F04D 29/563* (2013.01); *F04D 27/0246* (2013.01); *F05D 2220/32* (2013.01); *F05D 2230/60* (2013.01); *F05D 2250/75* (2013.01); *Y02T 50/672* (2013.01)

(58) Field of Classification Search
CPC ... F01D 17/162; F04D 29/563; F04D 27/0246
See application file for complete search history.

(56) References Cited

U.S. PATENT DOCUMENTS

| | | | |
|---|---|---|---|
| 3,788,763 A | 1/1974 | Nickels | |
| 5,601,401 A * | 2/1997 | Matheny | ............... F01D 17/162 415/160 |
| 6,984,104 B2 | 1/2006 | Alexander et al. | |
| 7,223,006 B2 | 5/2007 | Rockley | |

(Continued)

OTHER PUBLICATIONS

The International Search Report and Written Opinion for PCT Application No. PCT/US2014/045176, dated Apr. 13, 2015.

(Continued)

*Primary Examiner* — Jason Shanske
*Assistant Examiner* — Behnoush Haghighian
(74) *Attorney, Agent, or Firm* — Carlson, Gaskey & Olds, P.C.

(57) ABSTRACT

An example variable vane actuation system of a gas turbine engine includes, among other things, an actuation ring, a plurality of variable vanes circumferentially disposed about an engine axis, a plurality of vane arms configured to actuate the plurality of variable vanes, and a plurality of press fit members coupling the vane arms to the actuation ring.

20 Claims, 4 Drawing Sheets

(56) References Cited

U.S. PATENT DOCUMENTS

| | | | |
|---|---|---|---|
| 7,448,848 B2* | 11/2008 | Alexander | F01D 17/162 |
| | | | 415/159 |
| 8,038,387 B2 | 10/2011 | Houradou et al. | |
| 8,668,444 B2* | 3/2014 | Jarrett, Jr. | F01D 17/162 |
| | | | 415/160 |
| 2004/0208742 A1 | 10/2004 | Raulin et al. | |
| 2004/0240990 A1 | 12/2004 | Rockley | |
| 2005/0265824 A1 | 12/2005 | Alexander et al. | |
| 2005/0271502 A1 | 12/2005 | Burgmeier et al. | |
| 2012/0076658 A1 | 3/2012 | Jarrett, Jr. et al. | |

OTHER PUBLICATIONS

International Report on Patentability for Application No. PCT/US2014/045176 dated Jan. 21, 2016.

* cited by examiner

VARIABLE VANE ACTUATION SYSTEM

BACKGROUND

This disclosure relates to a variable vane actuation system for a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different and typically slower than the turbine section so as to provide a reduced part count approach for increasing the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Some areas of the engine may include variable vanes. The compressor, for example, may include one or more stages of variable vanes. Within each stage, vane arms connect each of the variable vanes to an actuation or synchronization ring. The actuation ring rotates about a central axis of the engine to pivot the vane arms, which then pivot the variable vanes to a vane angle that optimizes engine operability.

SUMMARY

A variable vane actuation system of a gas turbine engine according to an exemplary aspect of the present disclosure includes, among other things, an actuation ring, a plurality of variable vanes circumferentially disposed about an engine axis, a plurality of vane arms configured to actuate the plurality of variable vanes, and a plurality of press fit members coupling the vane arms to the actuation ring.

In a further non-limiting embodiment of the foregoing variable vane actuation system, rotation of the actuation ring about the engine axis causes the plurality of vane arms to each pivot about a respective radially extending axis.

In a further non-limiting embodiment of any of the foregoing variable vane actuation systems, the plurality of press fit members comprise a vane arm pin.

In a further non-limiting embodiment of any of the foregoing variable vane actuation systems, the plurality of press fit members each include a collar portion that is press fit within an aperture of a respective one of the plurality of vane arms.

In a further non-limiting embodiment of any of the foregoing variable vane actuation systems, a plurality of radially outboard bushing brackets each receive an extension of one of the press fit members that is radially outboard the collar portion, and further include a plurality of radially inboard bushing brackets that each receive an extension of one of the plurality press fit members that is radially inboard the collar portion.

In a further non-limiting embodiment of any of the foregoing variable vane actuation systems, the plurality of press fit members are configured to rotate with the plurality of vane arms, and to rotate relative to the actuation ring.

In a further non-limiting embodiment of any of the foregoing variable vane actuation systems, the actuation ring has an "I" shaped cross-sectional profile.

In a further non-limiting embodiment of any of the foregoing variable vane actuation systems, the plurality of variable vanes are positioned at a first stage of a compressor section of the gas turbine engine.

A variable vane actuation system of a gas turbine engine according to an yet another exemplary aspect of the present disclosure includes, among other things, a vane arm providing an aperture, and a vane arm pin including a collar portion that is press fit within the aperture, the vane arm pin further including at least one extension to pivotably engage with an actuation ring.

In a further non-limiting embodiment of the foregoing variable vane actuation system, the at least one extension includes a first extension to pivotably engage with the actuation ring radially outside the collar and a second extension to pivotably engage with the actuation ring radially inside the collar.

In a further non-limiting embodiment of any of the foregoing variable vane actuation systems, the first and second extensions have the same diameter.

In a further non-limiting embodiment of any of the foregoing variable vane actuation systems, the diameter is smaller than a diameter of the collar portion.

In a further non-limiting embodiment of any of the foregoing variable vane actuation systems, the at least one extension pivotably engages one or more bushing brackets of the actuation ring.

In a further non-limiting embodiment of any of the foregoing variable vane actuation systems, the collar portion is compressed when received within the aperture.

In a further non-limiting embodiment of any of the foregoing variable vane actuation systems, a flange of the vane arm pin has a diameter that is greater than diameter of the collar portion, and a radially facing surface of the flange contacting a radially facing surface of the vane arm when the collar portion is press fit within the aperture.

A method of coupling a vane arm to an actuation ring according to yet another exemplary aspect of the present disclosure includes, among other things, press fitting a collar portion of a vane arm pin into an one of a vane arm aperture or an actuation ring aperture, and pivotably attaching at least one extension portion of the vane arm pin to the other one of the vane arm or the actuation ring aperture.

In a further non-limiting embodiment of the foregoing method of coupling a vane arm to an actuation ring, the method includes attaching a bracket providing the actuation ring aperture directly to an actuation ring.

In a further non-limiting embodiment of the foregoing method of coupling a vane arm to an actuation ring, the method includes rotating the actuation ring to move the vane arm to pivot a variable vane about a radially extending axis.

In a further non-limiting embodiment of the foregoing method of coupling a vane arm to an actuation ring, the at least one extension portion includes a first radially inner extension pivotably attached to a first radially inner actuation ring bracket and a second radially outboard extension pivotably attached to a radially outer actuation ring bracket.

DETAILED DESCRIPTION

Figure 1:
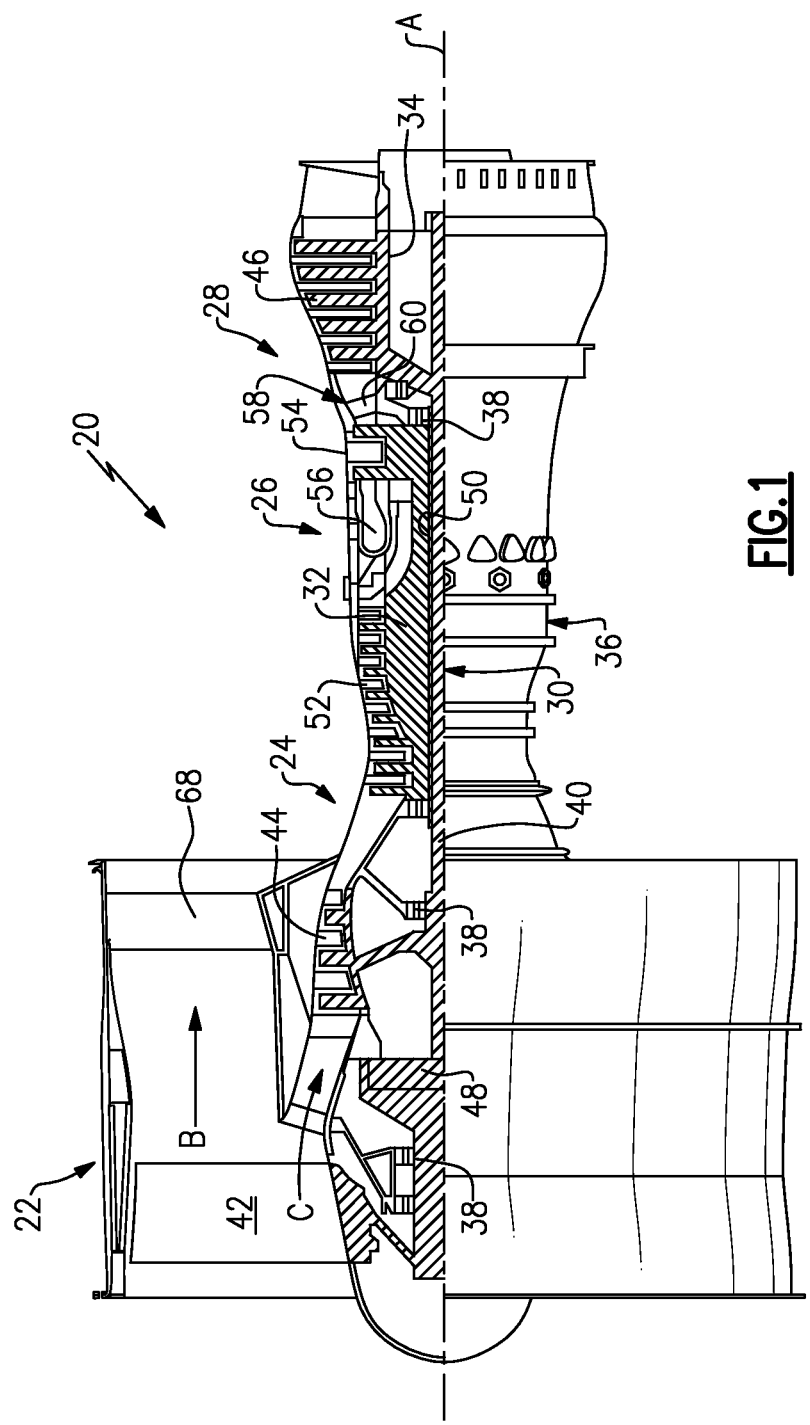
FIG. 1 schematically illustrates an example gas turbine engine.
Figure 2:
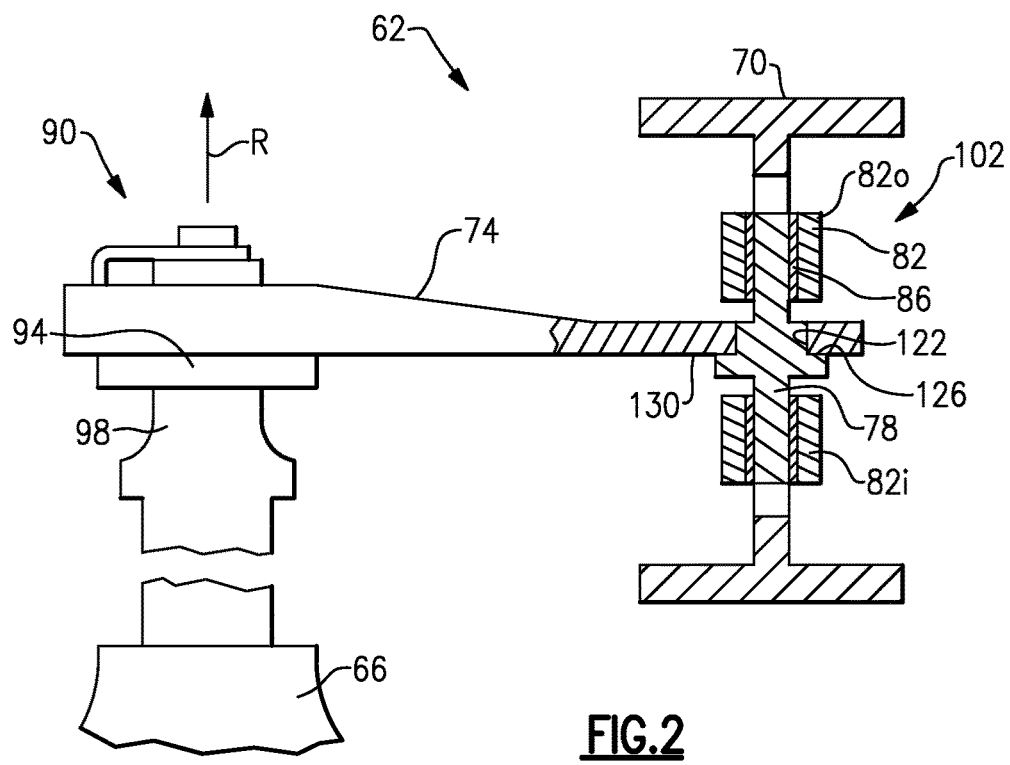
FIG. 2 illustrates a partial section view of an actuation system for a variable vane of the gas turbine engine of FIG. 1.
Figure 4:
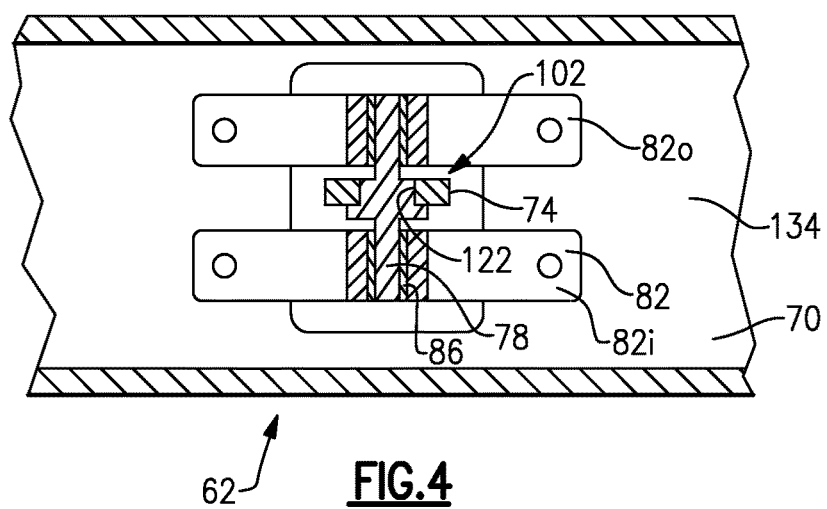
FIG. 4 illustrates a section view of a portion of the actuation system of FIG. 2.
Figure 3:
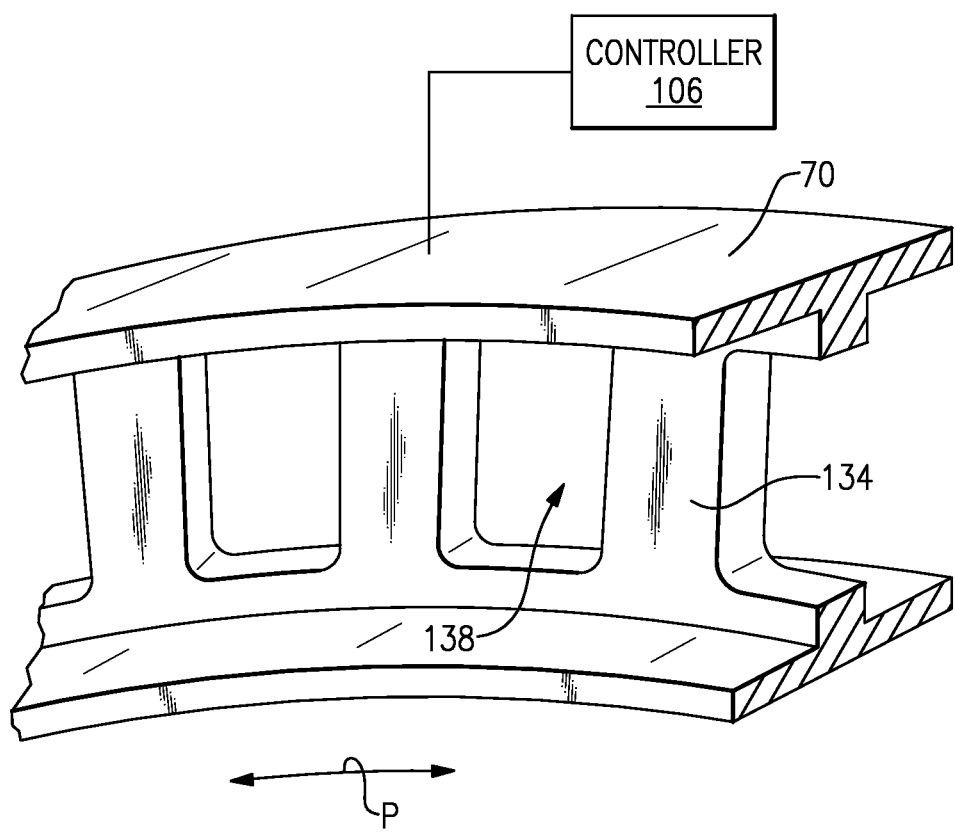
FIG. 3 illustrates a perspective view of a section of an actuation ring of the actuation system of FIG. 2.
Figure 5:
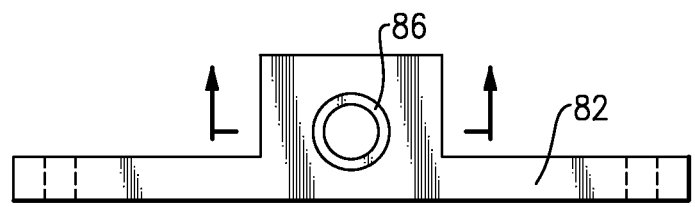
FIG. 5 shows a side view of a bushing bracket of the actuation system of FIG. 2.
Figure 6:
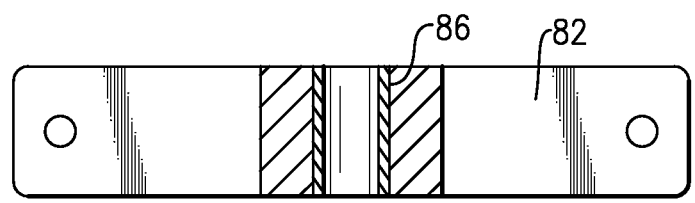
FIG. 6 shows a section view of the bushing bracket at line 5-5 in FIG. 6.
Figure 7:
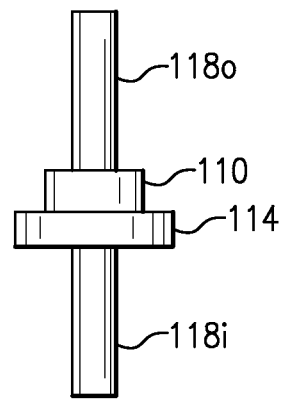
FIG. 7 shows a side view a press fit member of the attachment system of FIG. 2.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{\wedge}0.5$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring to FIGS. 2-7, an example actuation system 62 selectively actuates variable vanes 66 within a stage of the engine 20 of FIG. 1. The variable vanes 66 are distributed circumferentially about the axis A. When actuated by the system 62, the variable vanes 66 rotate about respective radially extending axes R, The rotational position of the variable vanes 66 controls flow through the engine 20.

In this example, the variable vanes 66 are within a first stage of the low pressure compressor section 44 of the engine 20. In other examples, the actuation system 62 may be utilized in other areas of the engine 20, such as the high pressure compressor 52, the turbine section 28, the fan section 22, the combustor 56, a fan exit guide vane array 68, other stages of the low pressure compressor 44, etc.

The actuation system 62 includes an actuation ring 70, a plurality of vane arms 74, a plurality of press fit members 78, a plurality of bushing brackets 82 and a plurality of bushings 86. Each of the variable vanes 66 is coupled to a first end 90 of one of the vane arms 74. The first end 90 engages the variable vane 66 such that rotation of the vane arm 74 about the axis R causes the variable vane 66 to rotate about the axis R Various attachment strategies may be used to secure the first end 90 to the variable vane 66. For example, the first end 90 of the vane arm 74 may include a claw portion 94 that engages a vane stem 98 of the variable vane 66. Other attachment strategies are used in other examples.

A second end 102 of the vane arm 74 is opposite the first end 90. The second end 102 is coupled to the actuation ring 70. The actuation ring 70 rotates circumferentially back and forth about the axis A along a path P to rotate the vane arm 74 about the axis R. A controller 106 may be utilized to initiate rotation of the actuation ring 70 about the axis A.

To couple the vane arm 74 to the actuation ring 70, the example actuation system 62 utilizes two of the bushing brackets 82 to hold opposing ends of the press fit member 78. The vane arm 74 and press fit member 78 are secured together such that the press fit member 78 rotates with the vane arm 74. The bushings 86 held by the bushing brackets 82 permit the press fit member 78 to rotate relative to the actuation ring 70. The press fit member 78 or vane arm pin is thus pivotably engaged with the actuation ring 70. The bushings 86 limit wear between parts pivoting relative to each other.

In another example, the press fit member 78 may be press fit into an aperture of the actuation ring and pivotably attached to the vane arm 74.

In this example, the press fit member 78 is a vane arm pin having a collar portion 110, a flange 114, a radially outer extension 118o and a radially inner extension 118i. The diameter of the collar portion 110 and the flange 114 is greater than a diameter of the extensions 118o and 118i. In this example, the collar portion 110 has a diameter that is less than a diameter of the flange 114.

The collar portion 110 and the flange 114 are located between the extensions 118o and 118i. In this example, a diameter of the extension 118o is the same as a diameter of the extension 118i.

To secure the press fit member 78 to the vane arm 74, the collar portion 110 of the press fit member 78 is forced into an aperture 122 of the second end 102 of the vane arm 74. The flange 114 has a radially facing surface 126 that contacts a radially facing surface 130 of the vane arm 74 to limit insertion of the collar portion 110 into the vane arm 74.

Prior to insertion of the collar portion 110 into the aperture 122, the collar portion 110 is oversized relative the aperture 122. Specifically, in this example, the diameter of the collar portion 110 may be from one to three millimeters greater than a diameter of the aperture 122 prior to inserting the collar portion 110 into the aperture 122. The collar portion 110, is thus compressed when forced into the aperture 122. The press fit, or interference fit, of the collar portion 110 holds the press fit member 78 relative to the vane arm 74 and limits relative rotation between the press fit member 78 and the vane arm 74 when the actuation ring 70 is rotated.

When the actuation system 62 is assembled, the extension 118o is received within a bushing 86o held by the bushing bracket 82o that is radially outboard the collar portion 110. The extension 118i is received within a bushing 86i held within the bushing bracket 82i that is radially inboard the collar portion 110. The bushing brackets 82o and 82i are secured directly to a radially extending web 134 of the actuation ring 70. Opposing ends of the bushing brackets 82i and 82o are secured directly to the actuation ring 70 with bolts, for example.

The actuation ring 70 has an I-shaped cross-sectional profile in this example. Windows 138 are provided in the web 134. Each window is associated with one of the vane arms 74. The windows 138 accommodate the second end 102 of the vane arm 74, the press fit member 78 and portions of the bushing brackets 82o and 82i. The windows 138 permit the bushing brackets 82o and 82i and the bushings 86o and 86i to hold the extensions 118o and 118i such that the press fit member 78 is centered axially within the radially extending web 134. This positioning facilitates efficient circumferential movement of the press fit member 78 during rotation of the actuation ring 70.

The bushings 86o and 86i permit the press fit member 78 in the vane arm 74 to rotate relative to the bushing brackets 82 when the actuation ring 70 is rotated about the axis A along the path P. The bushings 86o and 86i, in this example, are made of a composite material. The example bushing brackets 82 are steel.

Features of the disclosed examples include a variable vane actuation system having a relatively large bearing surface area compared to the prior art systems. Such increased bearing surface area is particularly useful in high loading environments and cyclical loading environments.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A variable vane actuation system of a gas turbine engine comprising: an actuation ring; a plurality of variable vanes circumferentially disposed about an engine axis; a plurality of vane arms configured to actuate the plurality of variable vanes, each of the plurality of vane arms defining an aperture having a first diameter; and a plurality of press fit members coupling the plurality of vane arms to the actuation ring, wherein each of the plurality of press fit members is a vane arm pin including a collar portion inserted into the aperture of a respective one of the plurality of vane arms, and the collar portion has a second diameter that is greater than the first diameter such that the collar portion is press fit within the aperture of the respective one of the plurality of vane arms to limit relative rotation.

2. The variable vane actuation system of claim 1, wherein rotation of the actuation ring about the engine axis causes the plurality of vane arms to each pivot about a respective radially extending axis.

3. The variable vane actuation system of claim 1, wherein each of the plurality of the vane arm pins include first and second extensions on opposed sides of the collar portion, and including a plurality of radially outboard bushing brackets that each receive the first extension of one of the plurality of the press fit members that is radially outboard the collar portion, and further including a plurality of radially inboard bushing brackets that each receive the second extension of one of the plurality of the press fit members that is radially inboard the collar portion.

4. The variable vane actuation system of claim 1, wherein the plurality of press fit members are configured to rotate with the plurality of vane arms, and to rotate relative to the actuation ring.

5. The variable vane actuation system of claim 1, wherein the actuation ring has an "I" shaped cross-sectional profile.

6. The variable vane actuation system of claim 1, wherein the plurality of variable vanes are positioned at a first stage of a compressor section of the gas turbine engine.

7. A variable vane assembly comprising:
a vane arm providing an aperture having a first diameter; and
a vane arm pin including a collar portion inserted into the aperture, the collar portion having a second diameter that is greater than the first diameter such that the collar portion is press fit within the aperture to limit relative rotation, the vane arm pin further including at least one extension to pivotably engage with an actuation ring.

8. The variable vane assembly of claim 7, wherein the at least one extension includes first and second extensions on opposed sides of the collar portion, the first extension to pivotably engage with the actuation ring radially outside the collar portion and the second extension to pivotably engage with the actuation ring radially inside the collar portion.

9. The variable vane assembly of claim 8, wherein the first and second extensions have the same diameter.

10. The variable vane assembly of claim 9, wherein the diameter is smaller than the second diameter.

11. The variable vane assembly of claim 8, including a flange of the vane arm pin having a third diameter that is greater than the first and second diameters such that the flange circumscribes a rim defining the aperture, a radially facing surface of the flange contacting a radially facing surface of the vane arm when the collar portion is press fit within the aperture, and wherein the flange extends from the collar portion such that the second extension extends radially inward from the flange.

12. The variable vane assembly of claim 7, wherein the at least one extension pivotably engages one or more bushing brackets secured to the actuation ring.

13. The variable vane assembly of claim 12, wherein the actuation ring has an "I" shaped cross-sectional profile, and each of the one or more bushing brackets spans across opposed sides of a window defined by a radially extending web of the actuation ring such that the vane arm pin is centered axially within the radially extending web.

14. The variable vane assembly of claim 13, wherein opposed ends of the vane arm pin are spaced apart from a perimeter of the window.

15. The variable vane assembly of claim 7, wherein the collar portion is compressed when received within the aperture.

16. The variable vane assembly of claim 7, including a flange of the vane arm pin having a third diameter that is greater than the second diameter of the collar portion, a radially facing surface of the flange contacting a radially facing surface of the vane arm when the collar portion is press fit within the aperture.

17. A method of coupling a vane arm to an actuation ring, comprising: press fitting a collar portion of a vane arm pin into a vane arm aperture, the vane arm aperture having a first diameter, and the collar portion having a second diameter that is greater than the first diameter such that the press fitting limits relative rotation; and pivotably attaching at least one extension portion of the vane arm pin to the actuation ring.

18. The method of claim 17, including attaching a bracket directly to the actuation ring, wherein the at least one extension portion pivotable engages the bracket.

19. The method of claim 18, including rotating the actuation ring to move the vane arm to pivot a variable vane about a radially extending axis.

20. The method of claim 17, wherein the at least one extension portion includes first radially inner and second radially outboard extensions on opposed sides of the collar portion, the first radially inner extension pivotably attached to a first radially inner actuation ring bracket and the second radially outboard extension pivotably attached to a radially outer actuation ring bracket.

* * * * *